United States Patent
Lee

(10) Patent No.: US 7,431,478 B2
(45) Date of Patent: Oct. 7, 2008

(54) LIQUID CRYSTAL DISPLAY DEVICE INCLUDING BACKLIGHT UNIT

(75) Inventor: Chul-Woo Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 763 days.

(21) Appl. No.: 10/973,801

(22) Filed: Oct. 27, 2004

(65) Prior Publication Data

US 2005/0088588 A1 Apr. 28, 2005

(30) Foreign Application Priority Data

Oct. 27, 2003 (KR) .................. 10-2003-0075002

(51) Int. Cl.
*F21V 29/00* (2006.01)
*G02F 1/1335* (2006.01)

(52) U.S. Cl. ............... 362/294; 362/373; 362/611; 349/65

(58) Field of Classification Search ........... 362/294, 362/373, 600, 611; 349/65
See application file for complete search history.

(56) References Cited

U.S. PATENT DOCUMENTS

| 3,898,494 A | * | 8/1975 | Levy ................... 313/15 |
| 7,311,432 B2 | * | 12/2007 | Huang et al. ........... 362/614 |
| 2004/0113044 A1 | * | 6/2004 | Ishiguchi ............. 250/205 |

FOREIGN PATENT DOCUMENTS

| CN | 1421729 A | 6/2003 |
| DE | 18 79 375 U | 9/1963 |
| JP | 2001-210130 A | 8/2001 |
| JP | 2003-015130 | 1/2003 |

* cited by examiner

*Primary Examiner*—Anabel Ton
*Assistant Examiner*—James Cranson
(74) *Attorney, Agent, or Firm*—Morgan, Lewis & Bockius LLP

(57) ABSTRACT

A liquid crystal display device includes a backlight unit having at least one lamp with an electrode at one end thereof, and at least one temperature controller adjacent to the electrode of the at least one lamp. The at least one temperature controller has a first thermocouple junction device electrically connected to a second thermocouple junction device.

20 Claims, 3 Drawing Sheets

LIQUID CRYSTAL DISPLAY DEVICE INCLUDING BACKLIGHT UNIT

The present invention claims the benefit of Korean Patent Application No. 2003-0075002, filed in Korea on Oct. 27, 2003, which is hereby incorporated by reference.

BACKGROUND OF THE INVENTION

1. Field of the Invention

The present invention relates to a liquid crystal display (LCD) device, and more particularly, to a backlight unit for an liquid crystal display and an LCD device including a backlight unit that effectively controls a temperature of a lamp.

2. Discussion of the Related Art

A general notebook personal computer (NTPC) is small in size so that a user may take advantage of information on the NTPC while the user is on the move. The NTPC uses a liquid crystal display module (LCM) as its display device. The LCM includes a liquid crystal (LC) panel and a driving circuit unit. The LC panel includes two glass substrates having pixels arranged in a matrix and switching elements for controlling signals supplied to the pixels. The driving circuit portion provides the signals to the switching elements, thereby driving the LC panel.

The LCM is a light receiving device that displays images by controlling transmittance of light provided from an outside source. Thus, to provide the light to the LC panel, the LCM requires an additional light source, such as a backlight unit including a lamp.

FIG. 1 is a cross-sectional view of a liquid crystal display module (LCM) according to the related art. The related art LCM includes a liquid crystal (LC) panel 2, a main support 14 in which the LC panel 2 is disposed, a top case 10 that completely covers the main support 14 and partially covers an edge of the LC panel 2, a backlight unit disposed under the LC panel 2, and a bottom case 12 disposed under the backlight unit.

The LC panel 2 includes two substrates and a liquid crystal layer is interposed between the two substrates. Upper and lower polarizers 42 and 40 are arranged on outer surfaces of the two substrates, respectively. Liquid crystal pixels are arranged in a matrix between the two substrates, and each liquid crystal pixel is driven by a thin film transistor.

The top case 10 is curved to cover a side of the main support 14 and the edge of the LC panel 2. The main support 14 and the top case 10 are combined by a screw (not shown). The main support 14, generally, is formed by casting a mold. Recently, the main support 14 has been formed of a metal material having a high heat protection property, such as aluminum (Al), for high brightness televisions or monitors.

The backlight unit includes a lamp 20, a lamp housing 16, a light guide plate 24, a reflector 26, and optical sheets 32, 34 and 36. The reflector 26 is disposed over the bottom case 12. The light guide plate 24 and the optical sheets 32, 34 and 36 are sequentially disposed over the reflector 26. The LC panel 2 is disposed over the optical sheets 32, 34 and 36 in the main support 14.

The lamp 20 emits light, and the lamp housing 16 has an opening and surrounds the lamp 20. The lamp 20 and the lamp housing 16 are disposed at a side of the light guide plate 24 such that the opening of the lamp housing 16 corresponds to the side of the light guide plate 24. The reflector 26 is disposed at a backside of the light guide plate 24. The optical sheets include a diffusing sheet 32, a first prism sheet 34 and a second prism sheet 36. The diffusing sheet 32, the first prism sheet 34 and the second prism sheet 36 are sequentially disposed over the light guide plate 24.

A cold cathode fluorescent lamp is commonly used as the lamp 20. Light emitted from the lamp 20 is provided to the light guide plate 24 through the side of the light guide plate 24 corresponding to the opening of the lamp housing 16. The lamp housing 16 reflects light radiantly emitted from the lamp 20 toward the light guide plate 24. The light guide plate 24 has a flat front side and an inclined rear side. The light guide plate 24 changes linear light from the lamp 20 into plane light. The reflector 26 reflects light passing through the rear side of the light guide plate 24 toward the front side of the light guide plate 24 again, thereby reducing light loss.

Thus, light emitted from the lamp 20 provided to the light guide plate 24, and reflected at the inclined rear side of the light guide plate 24 is uniformly transmitted toward the front side of the light guide plate 24. At this time, light incident on the reflector 26 passing through the rear side of the light guide plate 24 is reflected at the reflector 26, and transmitted to the front side of the light guide plate 24. The light transmitted through the front side of the light guide plate 24 is diffused by the diffusing sheet 32 in all directions. The diffused light is condensed within predetermined angles with respect to a normal line to the LC panel 2, passing through the first and second prism sheets 34 and 36.

The LCM having the above structure may be used as a display device for monitors or televisions, especially, for the display devices that may be driven by high voltage and high current. In this case, temperatures of electrodes at both sides of the lamp 20 increase by about 200 degrees Celsius, thereby thermally damaging elements near the electrodes, for example, the light guide plate 24.

SUMMARY OF THE INVENTION

Accordingly, the present invention is directed to a liquid crystal display (LCD) device including a backlight unit that substantially obviates one or more of the problems due to the limitations and the disadvantages of the related art.

An object of the present invention is to provide a backlight unit and a liquid crystal display device (LCD) so that thermal damage due to an increased temperature of a lamp is prevented.

Another object is to provide an LCD device including a backlight unit that prevents damage of elements around the backlight unit due to heat from a lamp of the backlight unit.

Another object is to provide an LCD device where the lamp is stabilized and the lifespan of the lamp is increased.

Another object is to provide a liquid crystal display device including a backlight unit with the above mentioned features, and a liquid crystal panel arranged over the backlight unit. Thus, a simple and efficient cooling of the lamp is realized with very few effort. With the present invention, it is now possible to control the overall temperature in the LCD device, in particular to prevent the LCD device from overheating due to the heat generated by the backlight lamps. This in particular protects the light guide plate in an indirect type backlight unit from heat damage. However, the present invention may also be used in a direct type backlight unit.

Another object is to provide the backlight unit including a light guide plate neighbouring at least one lamp and optical sheets over the light guide plate so that the light guide plate is surely protected from being overheated, particularly in the indirect type backlight unit.

Another object is to provide the backlight unit including the thermoelectric device which supply a power to a Peltier device. In other words, power from the thermoelectric device is used to make the Peltier device work.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, a backlight unit comprises at least one lamp having an electrode at one end thereof; at least one temperature controller adjacent to the electrode of the at least one lamp, the at least one temperature controller including a first thermocouple junction device electrically connected to a second thermocouple junction device.

In another aspect, a liquid crystal display device comprises a backlight unit including; at least one lamp having an electrode at one end thereof, at least one temperature controller adjacent to the electrode of the at least one lamp with the at least one temperature controller having a first thermocouple junction device electrically connected to a second thermocouple junction device; a liquid crystal panel arranged over the backlight unit; and a diving circuit to drive the liquid crystal panel.

In another aspect, a backlight unit comprises at least one lamp having an electrode at one end thereof, at least one temperature controller adjacent to the electrode of the at least one lamp, the at least one temperature controller including a thermoelectric device electrically connected to a Peltier device.

It is to be understood that both the foregoing general description and the following detailed description are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this specification, illustrate embodiments of the present invention and together with the description serve to explain the principles of the present invention. In the drawings.

DETAILED DESCRIPTION OF THE PREFERRED EMBODIMENTS

Reference will now be made in detail to embodiments of the present invention, examples of which are illustrated in the accompanying drawings.

Figure 1:
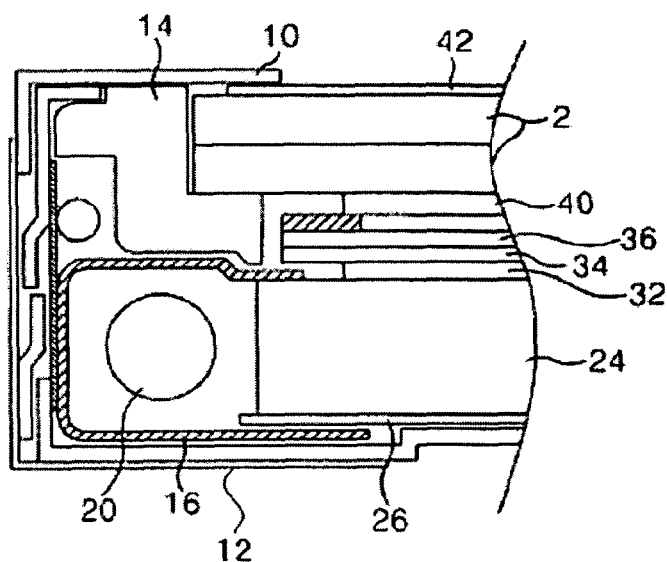
FIG. 1 is a cross-sectional view of a liquid crystal display module (LCM) according to the related art.
Figure 2:
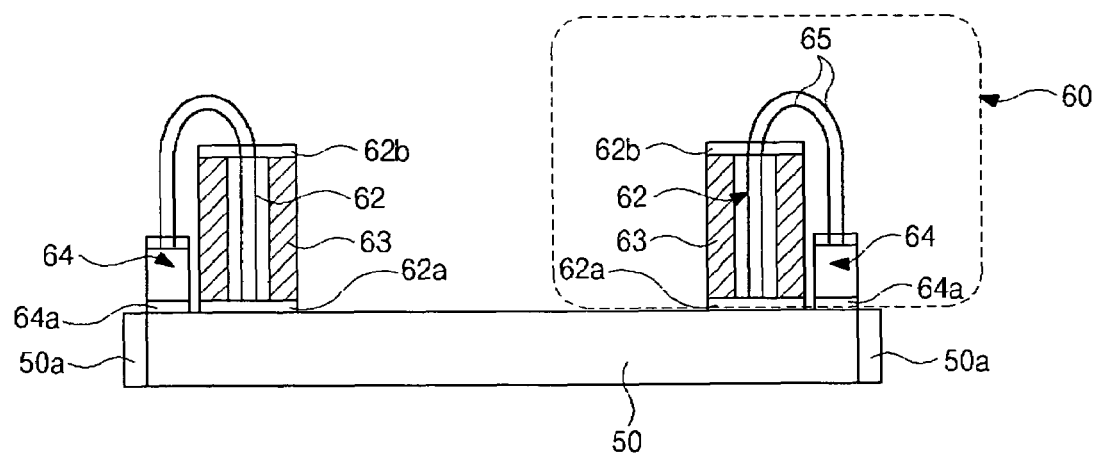
FIG. 2 is a schematic view of a liquid crystal display module (LCM) according to a first embodiment of the present invention.

FIG. 2 is a schematic view of a liquid crystal display module (LCM) according to a first embodiment of the present invention. In FIG. 2, a lamp and a temperature controller are illustrated, and a liquid crystal panel and other elements of a backlight unit, which may have the same structure as the related art, are omitted.

As shown in FIG. 2, a lamp 50 has electrodes 50a at both ends thereof. A cold cathode fluorescent lamp may be used as the lamp 50. Two temperature controllers 60 are equipped near the respective ends of the lamp 50. Each of the temperature controllers 60 includes a thermoelectric device 62 and a Peltier device 64.

The thermoelectric device 62 has a hot junction 62a, a cold junction 62b, and an adiabatic tape 63. The hot junction 62a is located nearby or contacting the electrode 50a of the lamp 50. The cold junction 62b is spaced apart from the electrode 50a of the lamp 50. The adiabatic tape 63 covers other portions of the thermoelectric device 62 except for the hot junction 62a and the cold junction 62b. The hot junction 62a is heated by thermal energy from the electrode 50a of the lamp 50. The cold junction 62b has a lower temperature than the hot junction 62a. The adiabatic tape 63 may include one of polystyrene and a material having a crystal structure of tobermorite such as $5CaO \cdot 6SiO_2 \cdot 5H_2O$ or a crystal structure of xonotolite such as $6CaO \cdot 6SiO_2 - H_2O$.

The Peltier device 64 has a heat-absorbing portion 64a. The heat-absorbing portion 64a is closer to the electrode 50a of the lamp 50 than the hot junction 62a of the thermoelectric device 62 or contacts the electrode 50a of the lamp 50. Although not shown in FIG. 2, the Peltier device 64 includes a heat-evolving portion. The heat-evolving portion is spaced apart from the electrode 50a of the lamp 50. A transporting line 65 connects the thermoelectric device 62 and the Peltier device 64, whereby electric power generated from the thermoelectric device 62 is supplied to the Peltier device 64 through the transporting line 65.

Figure 3:
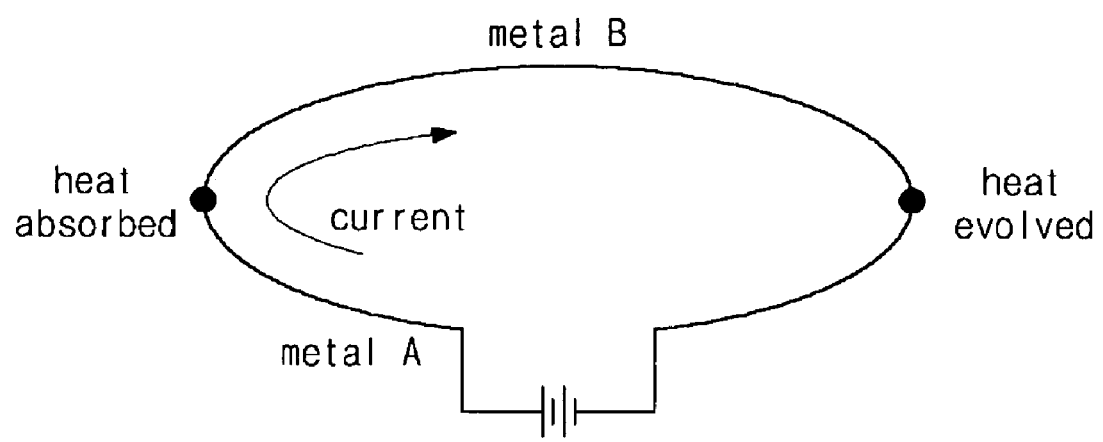
FIG. 3 is a view illustrating a driving mechanism of a Peltier device for a liquid crystal display module (LCM) according to the present invention.

FIG. 3 is a view illustrating a driving mechanism of a Peltier device for a liquid crystal display module according to the present invention. In FIG. 3, two different metals (or metal lines) A and B contact each other with two junctions. The metals A and B form a thermocouple. If a source of electromotive force (emf) is placed in the thermocouple, electrons move due to potential difference, and thus, current flows in the thermocouple. At this time, heat also moves according to movement of the electrons. This is referred to as Peltier effect. That is, a free electron, which moves due to the electromotive force, absorbs energy (heat) to be transited into a metal having higher Fermi level. The free electron evolves energy (heat) to be transited into a metal having lower Fermi level. Thus, the Peltier device of the present invention uses the Peltier effect. The two different metals for the Peltier device may have combinations such as Cu(copper)/Bi(bismuth), Cu/Sb(antimony), Cu/Fe(iron), and Cu/Constantan (an alloy of about 60% Cu and about 40% Ni(nickel)). The two different metals may include a combination of p-type semiconductor and n-type semiconductor. The p-type semiconductor may include an element of IV group such as silicon (Si) and germanium (Ge) and an element of III group such as boron (B), aluminum (Al), gallium (Ga) and indium (In), and the n-type semiconductor may include an element of IV group such as Si and Ge and an element of V group such as arsenic (As) and antimony (Sb).

Figure 4:
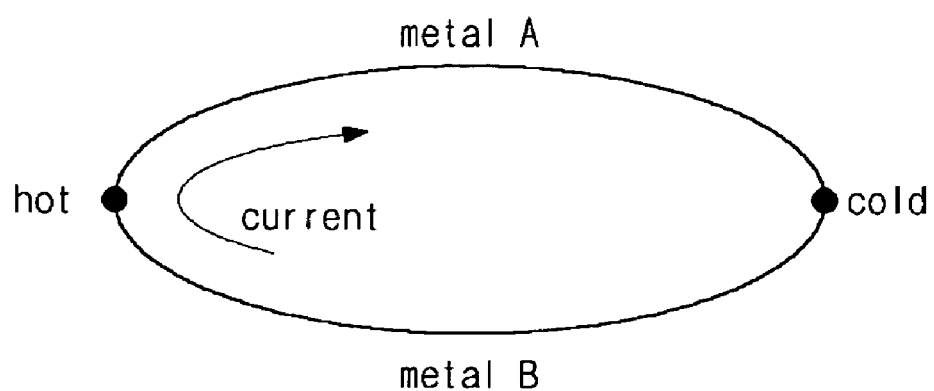
FIG. 4 is a view illustrating a Seebeck effect mechanism of a temperature controller according to the present invention.

On the other hand, the thermoelectric device 62 of the temperature controller 60 of FIG. 2 uses Seebeck effect. FIG. 4 illustrates a Seebeck effect mechanism of a temperature controller according to the present invention. In FIG. 4, two different metals (or metal lines) A and B contact each other with two junctions. If there exists a temperature difference between the junctions, flow of free electrons is generated due to a difference in thermal energies of the junctions, thereby creating a thermo electromotive force (or Seebeck voltage) E. The two different metals for the Seebeck effect may have one of combinations such as Cu(copper)/Bi(bismuth), Cu/Sb(antimony), Cu/Fe(iron), and Cu/Constantan (an alloy of about 60% Cu and about 40% Ni(nickel)).

The LCM of the present invention uses the above two mechanisms, the Peltier effect and the Seebeck effect. Thermal energy around the electrode 50a of the lamp 50 in FIG. 2 is changed into electrical energy through the thermoelectric device 62. The electrical energy is supplied to the Peltier device 64, and the Peltier device 64 absorbs heat from the lamp 50, thereby cooling the lamp 50.

Since the hot junction 62a of the thermoelectric device 62 is close to the electrode 50a of the lamp 50 and the cold junction 62b is farther from the electrode 50a of the lamp 50 as compared to the hot junction 62a, there exists a temperature difference between the hot junction 62a and the cold junction 62b. Thus, the thermo electromotive force (or Seebeck voltage) is generated due to the temperature difference. To prevent conduction of heat at portions except for the hot and cold junctions 62a and 62b, the adiabatic tape 63, beneficially, covers the portions of the thermoelectric device 62. The thermo electromotive force is supplied to the Peltier device 64 through the transporting line 65.

The heat-absorbing portion 64a of the Peltier device 64 is closer to the electrode 50a of the lamp 50 than the hot junction 62a of the thermoelectric device 62 or is in contact with the electrode 50a of the lamp 50. When the thermo electromotive force is supplied to the Peltier device 64, the heat-absorbing portion 64a absorbs the heat generated from the lamp 50 according to the Peltier effect. Thus, the lamp 50 is cooled.

The cooling of the lamp 50 prevents thermal damage of the light guide plate (not shown) neighboring the lamp 50. In addition, a local heat island effect around the lamp 50 that a central portion has higher temperature than portions surrounding the central portion may be prevented, and the temperature of the lamp 50 may be controlled.

On the other hand, if the thermo electromotive force supplied to the Peltier device 64 from the thermoelectric device 62 has the opposite polarity, heat is evolved at the heat-absorbing portion 64a of the Peltier device 64, and heat is absorbed at the heat-evolving portion (not shown). Thus, the temperature controller 60 can be used depending on a purpose of a user. In the present invention, the backlight unit may include a light-emitting diode (LED) lamp as the lamp.

Figure 5:
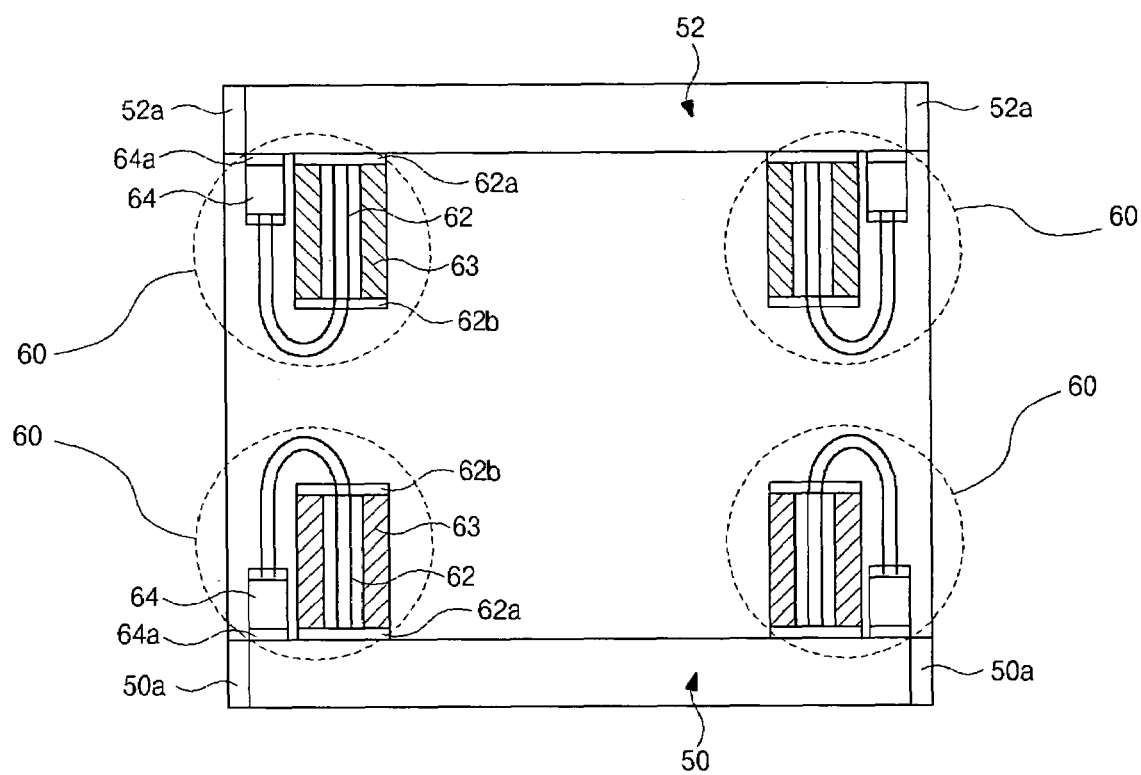
FIG. 5 is a schematic view of a liquid crystal display module (LCM) according to a second embodiment of the present invention.

FIG. 5 is a schematic view of a liquid crystal display module (LCM) according to a second embodiment of the present invention. The LCM of the second embodiment, which may be used for monitors or televisions, may have a plurality of lamps. Here, the lamps and temperature controllers may be illustrated.

In FIG. 5, two lamps 50 and 52 are spaced apart from each other. Each of the lamps 50 and 52 has electrodes 50a and 52a at both ends of each lamp. Temperature controllers 60 are equipped near the electrodes 50a and 52a, respectively. Each temperature controller 60 includes a thermoelectric device 62 and a Peltier device 64. Hot junctions 62a of the thermoelectric device 62 are close to or in contact with the electrodes 50a and 52a, and cold junctions 62b of the thermoelectric device 62 are disposed in a middle area of LCM between the lamps 50 and 52. The cold junctions 62b are at lower temperatures than the hot junctions 62a.

In each temperature controller 60, thermo electromotive force is generated from the thermoelectric device 62, and is supplied to the Peltier device 64, thereby cooling the lamp 50 or 52.

In the present invention, the lamp is cooled by using the temperature controller including the thermoelectric device and the Peltier device, and the life span of the lamp is increased. In addition, other elements of the LCM, for example, the light guide plate, can be protected from deformation due to the heat of the lamp. The temperature controller generates electromotive force by itself without outer power source and cools the lamp. Thus, lower power consumption can be achieved.

It will be apparent to those skilled in the art that various modifications and variations can be made in the liquid crystal display including backlight Unit of the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
    at least one lamp having an electrode at one end thereof; and
    at least one temperature controller adjacent to the electrode of the at least one lamp, the at least one temperature controller including a first thermocouple junction device electrically connected to a second thermocouple junction device,
    wherein the first thermocouple junction device supplies the second thermocouple junction device with a power source.

2. The backlight unit according to claim 1, wherein the first thermocouple junction device includes a hot junction and a cold junction, the hot junction being closer to the at least one lamp than the cold junction.

3. The backlight unit according to claim 2, wherein the hot junction is closer to the electrode of the at least one lamp than the cold junction.

4. The backlight unit according to claim 1, wherein the second thermocouple junction device includes a heat-absorbing portion and a heat-evolving portion, the heat-absorbing portion being closer to the electrode of the at least one lamp than the heat-evolving portion.

5. The backlight unit according to claim 4, wherein the heat-absorbing portion of the second thermocouple junction device is closer to the electrode of the at least one lamp than a hot junction of the first thermocouple junction device.

6. The backlight unit according to claim 1, wherein the first thermocouple junction device generates a thermo electromotive force from heat of the at least one lamp and supplies the thermo electromotive force to the second thermocouple junction device, and the second thermocouple junction device absorbs the heat of the at least one lamp due to the thermo electromotive force.

7. The backlight unit according to claim 1, wherein the first thermocouple junction device includes a thermoelectric device and the second thermocouple junction device includes a Peltier device.

8. The backlight unit according to claim 6, wherein the second thermocouple junction device uses a Peltier effect and the first thermocouple junction device uses a Seebeck effect.

9. The backlight unit according to claim 3, wherein at least one portion of the first thermocouple junction device except for the hot and the cold junctions is cut off from heat of the at least one lamp.

10. The backlight unit according to claim 3, wherein at least one portion of the first thermocouple junction device except for the hot and cold junctions is covered with an adiabatic tape.

11. A liquid crystal display device, comprising:
a backlight unit includes;
at least one lamp having an electrode at one end thereof, and
at least one temperature controller adjacent to the electrode of the at least one lamp, the at least one temperature controller having a first thermocouple junction device electrically connected to a second thermocouple junction device;
a liquid crystal panel arranged over the backlight unit; and
a driving circuit to drive the liquid crystal panel,
wherein the first thermocouple junction device supplies the second thermocouple junction device with a power source.

12. The liquid crystal display device according to claim 11, wherein the first thermocouple junction device includes a hot junction and a cold junction, the hot junction being closer to the at least one lamp than the cold junction.

13. The liquid crystal display device according to claim 12, wherein the hot junction is closer to the electrode of the at least one lamp than the cold junction.

14. The liquid crystal display device according to claim 11, wherein the second thermocouple junction device includes a heat-absorbing portion and a heat-evolving portion, the heat-absorbing portion being closer to the electrode of the at least one lamp than the heat-evolving portion.

15. The liquid crystal display device according to claim 14, wherein the heat-absorbing portion of the second thermocouple junction device is closer to the electrode of the at least one lamp than a hot junction of the first thermocouple junction device.

16. The liquid crystal display device according to claim 11, wherein the first thermocouplejunction device generates a thermo electromotive force from heat of the at least one lamp and supplies the thermo electromotive force to the second thermocouple junction device, and the second thermocouple junction device absorbs the heat of the at least one lamp due to the thermo electromotive force.

17. The liquid crystal display device according to claim 11, wherein the first thermocouple junction device includes a thermoelectric device and the second thermocouple junction device includes a Peltier device.

18. The liquid crystal display device according to claim 16, wherein the second thermocouple junction device uses a Peltier effect and the first thermocouple junction device uses a Seebeck effect.

19. The liquid crystal display device according to claim 13, wherein at least one portion of the first thermocouple junction device except for the hot and the cold junctions is cut off from heat of the at least one lamp.

20. The liquid crystal display device according to claim 13, wherein at least one portion of the first thermocouple junction device except for the hot and cold junctions is covered with an adiabatic tape.

\* \* \* \* \*